Sept. 26, 1961 J. G. WARHOL 3,001,575
AUXILIARY RESERVOIR FOR FUEL TANKS
Filed Dec. 9, 1957 2 Sheets-Sheet 1

*INVENTOR.*
JOHN G. WARHOL
BY
Whittemore Hulbert & Belknap
ATTORNEYS

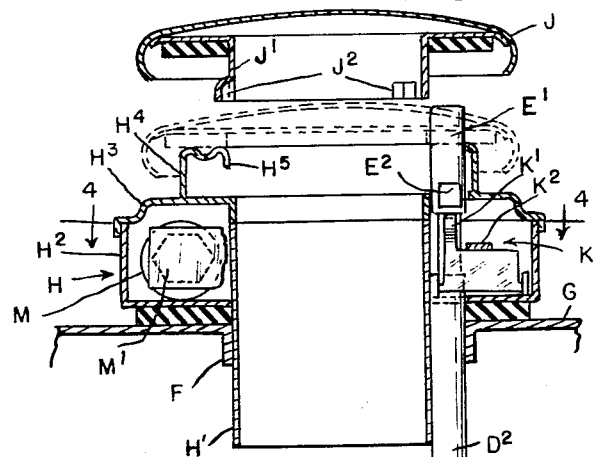
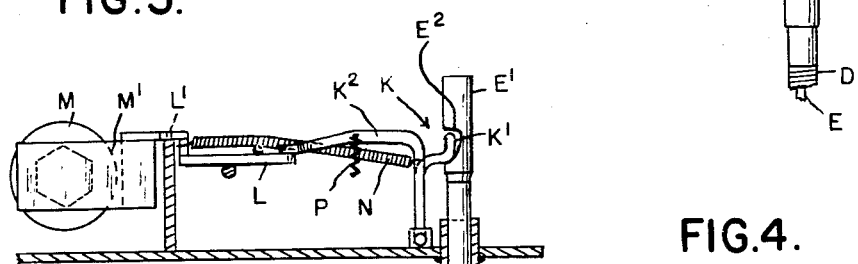
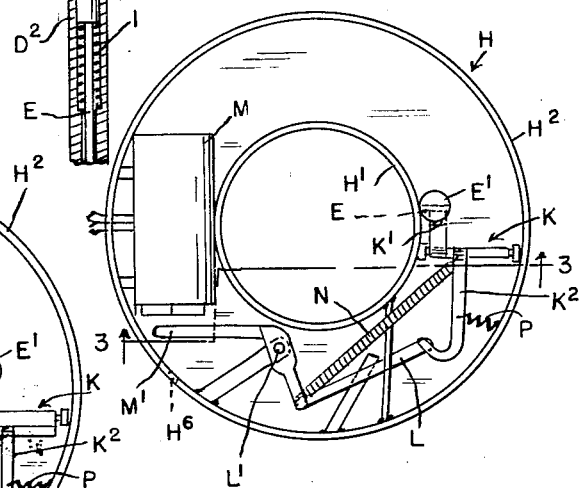
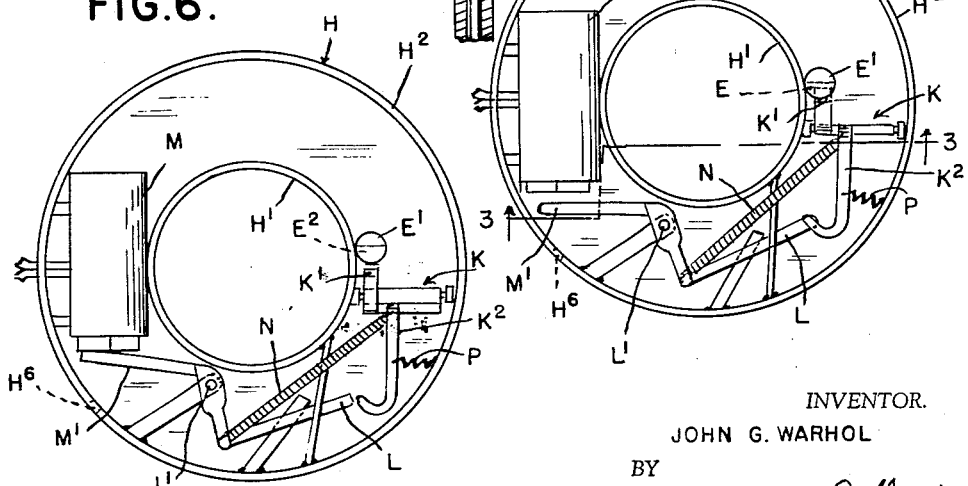
INVENTOR.
JOHN G. WARHOL

United States Patent Office 3,001,575
Patented Sept. 26, 1961

3,001,575
AUXILIARY RESERVOIR FOR FUEL TANKS
John G. Warhol, 14041 Vernon, Oak Park, Mich.
Filed Dec. 9, 1957, Ser. No. 701,500
9 Claims. (Cl. 158—46.5)

The invention relates to auxiliary reservoir for fuel tanks and of that type in which said reservoir is collapsible so that it may be introduced through the fill opening of the main fuel tank. It is one of the objects of the invention to obtain a construction in which the placing of the closure cap on the main tank after filling will automatically place the auxiliary reservoir in condition to retain its content until released by a separate operation. It is a further object to obtain a construction in which the auxiliary reservoir is biased to discharge its content into the main tank but is prevented from so doing without use of valves by the operation of mechanism actuated by the closing of said main tank.

With these and other advantageous features in view the invention consists in the construction as hereinafter set forth.

In the accompanying drawings:

FIG. 3 is a vertical section through the fill tube and adjacent mechanism on line 3—3, FIG. 4 with the fill cap shown in full lines before closing and in dotted lines in closing position.

FIG. 4 is a section on line 4—4, FIG. 3 showing the locking mechanism in locked position.

FIG. 5 is a sectional elevation showing (diagrammatically as in a plane), the locking means for the discharge tube when in raised position.

FIG. 6 is the same as FIG. 4 with the locking mechanism in unlocked position.

Figure 1:
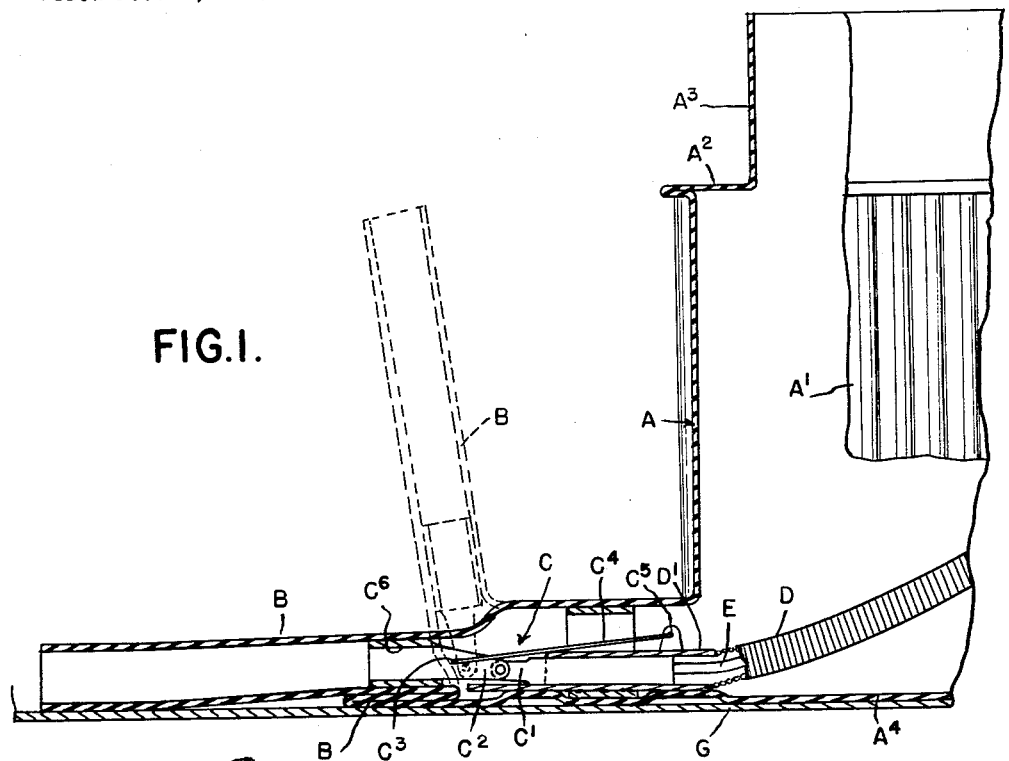
FIG. 1 is a sectional elevation showing a portion of the auxiliary reservoir and discharge tube therefor resting on the bottom of the main tank.
Figure 2:
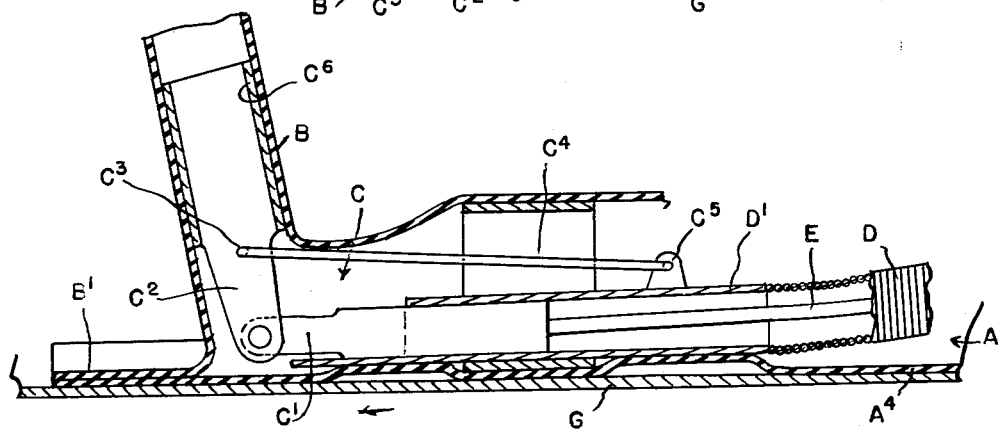
FIG. 2 is an enlarged sectional elevation of the mechanism for bending the discharge tube to extend upward.

The auxiliary reservoir A is preferably formed of flexible and resilient material unaffected by the liquid fuel, such for instance as neoprene. It may be molded or otherwise formed as an open top receptacle of the desired capacity, preferably having the side walls $A'$ thereof with vertically extending corrugations therein to impart, when filled, greater stability thereto. There is also preferably a marginal top portion $A^2$ and upstanding flange $A^3$ which assists in holding it in shape. Connected to the side wall adjacent to the bottom $A^4$ is an outwardly extending flexible tube B biased to lie in the bottom of the main tank but capable to being bent upward to have its discharge end of equal height to the marginal top portion $A^2$ of the reservoir. As thus far described this auxiliary reservoir, together with attachments to be later described, may be introduced through the fill opening of any ordinary fuel tank to rest upon the bottom thereof.

For raising the outer end of the tube B from its biased position adjacent to the bottom of the main tank there is provided within said tube mechanism C actuable through a flexible conduit D by a flexible rod E therein, both extending to the fill tube F of the main tank G. As specifically shown, the mechanism C includes a link $C'$ directly connected to the lower end of the flexible rod E and longitudinally movable within a guide bearing $D'$ at the end of the flexible conduit D. A lever $C^2$ is pivotally connected at one end to said link $C'$ and extends longitudinally therefrom within the tube B. A pivotal fulcrum $C^3$ of this lever is at the free end of a link $C^4$ connected at its opposite end to a pivot $C^5$ on the bearing $D'$. In one position the link $C'$ and lever $C^2$ are in longitudinal alignment but when actuated by the rod E in the direction of the arrow, the lever $C^2$ will be turned on its fulcrum through an angle of approximately ninety degrees and also with respect to the link $C'$. Such movement is permitted by the swinging of the link $C^4$ on its pivot $C^5$. The outer end of the lever $C^2$ is connected to a liner tube $C^6$ within the flexible tube B and therefore carries with it the latter tube from its horizontal to a substantially vertical position where its outer end is at a height substantially equal to that of the marginal top portion $A^2$ of the reservoir.

As above stated both the flexible conduit D and flexible rod E. extend to the fill tube F of the main tank G. Engageable with this fill tube is an annular housing H having a portion $H'$ within said tube and a portion $H^2$ of larger diameter surrounding said portion $H'$. The flexible conduit D is connected to the member H between the portions $H'$ and $H^2$ thereof and the flexible rod E extends outward beyond the conduit D. A helical spring I is housed within an enlarged diameter portion $D^2$ of the conduit D which is directly connected to the member H and surrounds a portion of the rod E engaging a shoulder thereon. This will bias said rod to move outward into a position where the link $C'$ and lever $C^2$ of the mechanism C are in longitudinal alignment. However, pressure on the outer end of the rod $E'$ will move said link and lever into the relative angular positions as above described. Such pressure is produced by a closure cap J engageable with the annular housing H and when moved thereon into closed and locked position. It is however necessary to lock the rod in such position even when the closure cap J is removed so that after filling both the main tank and auxiliary reservoir with fuel the latter will be restrained from emptying its content. This as specifically shown is accomplished by the following construction:

The outer end portion $E'$ of the flexible rod E projects upward into the path of the closure cap J when it is being placed on the annular housing member H so that engagement with said member H will depress the member $E'$. A latch member K pivoted within the housing H has a finger $K'$ adjacent to the member $E'$ adapted when the latter is depressed to engage a recess $E^2$ therein and rock the member K. Spring P is a compression spring connected at its ends to the housing H and to latch member $K^2$. Spring P presses upward on arm $K^2$ to urge the latter toward the recess $E^2$. This rocking movement of member K will cause a laterally extending arm $K^2$ of the member K to form a latch engagement with an arm L of a pivoted member $L'$, thereby preventing return movement of said member K and disengagement of the finger $K'$ from the member $E'$. A spring N is connected at its ends to member K and pivoted member $L'$, so that movement of member K as aforesaid will move the member $L'$, through the spring, to a position of latching engagement between arm L and arm $K^2$. Thus the member $E'$ will be locked down by the finger $K'$ against the return pressure of the spring I. The depression of the member $E'$ will, as above described, actuate the rod E and mechanism C to raise the discharge end of the flexible tube B to substantially the level of the top of the auxiliary reservoir A. It will thus be understood that after the main tank is filled with fuel, the auxiliary reservoir being simultaneously filled, the engagement of the closure cap J will place the auxiliary reservoir in a condition to retain its content even when all of the surrounding fuel in the tank G has passed out therefrom. It will also continue in this condition if the closure cap is removed for the latch member K will still hold the member $E'$ depressed. To release the fuel by the lowering of the tube B it is first necessary to release the latch member K which in the construction illustrated is accomplished by an electromagnet M within the annular housing H. This when energized will attract its armature M' which is attached to the pivoted member L' moving the latter to release the arm K². Spring P will return the member K to a position wherein finger K' is biased against member E' and spring N will return the armature M' to its original position when the magnet M is deenergized. The armature may if desired be moved to release member K by a pin inserted into the housing H through hole H₆.

The closure cap J may be held in closed position by any suitable means but as shown the annular housing H has an annular top portion H³ with an upwardly extending flange H⁴ surrounding its inner periphery on which the cap J rests. There is also a return bent flange H⁵ within the flange H⁴ which fits a flange J' on said cap J. Radially extending lugs J² on the flange J' pass through apertures in the flange H⁵ and when the cap is turned lock with cam portions of said flange. It is during the initial engagement of the cap on the housing, even before the cap is turned to lock it in place, that the member E' is depressed.

The tube B in a portion thereof which is bent upward or downward by the mechanism C is subjected to stresses which might eventually rupture the same. This I have prevented by forming said tube with a folded portion B' on its underside and at the point where the bending occurs. Thus when the tube is moved upward this fold will supply additional length of material for the outer curve of the bend, which, when the tube is lowered, will return to its folded position.

What I claim as my invention is:

1. The combination with a main liquid fuel tank having a fill opening and a closure therefor of an auxiliary fuel reservoir therewithin resting on the bottom thereof, a reservoir discharge tube connected at one end to a low portion of said reservoir, the other end of said tube being open and in a lower position thereof lying adjacent to said bottom of said main fuel tank whereby said reservoir is adapted to be filled with the filling of said main tank, and mechanism operated by the closing of the fill opening of said main tank with said closure for raising the open end of said tube to a level substantially above the bottom of said main fuel tank.

2. The construction as in claim 1 having means for retaining the open end of said tube in its raised position regardless of any subsequent opening or closing of said fill opening and separately operating means for returning said tube end to its lower position.

3. The construction as in claim 1 in which a cap forms the closure means for said fill opening and said mechanism includes a displaceable actuating member in the path of said cap when moved to its closed position.

4. The construction as in claim 3 provided with a latch for holding said displaceable member in its displaced position independently of said cap and separately operated means for releasing said latch to permit the return of said tube end to its lower position.

5. The construction as in claim 1 in which said mechanism includes a lever extending longitudinally within said tube, an anchored fulcrum for said lever also within said tube, a flexible conduit extending from the anchor through said tube and tank to a point adjacent to said fill opening, a flexible rod longitudinally movable within said conduit and operatively engaging said lever to turn the same through an angle of substantially ninety degrees, thereby bending the surrounding tube to raise the open end thereof.

6. The construction as in claim 1 in which said tube has a folded portion in the wall thereof located to be on the long side of the bend and furnishing the necessary additional length without stretching.

7. The combination with a main liquid fuel tank having a fill opening and a closure therefor of an auxiliary fuel reservoir therewithin, a reservoir discharge tube connected at one end to a low portion of said reservoir, the other end of said tube being open and in a lower position thereof lying adjacent to said bottom of said main fuel tank whereby said reservoir is adapted to be filled with the filling of said main tank, and mechanism operated by the closing of the fill opening of said main tank with said closure for raising the open end of said tube to a level substantially above the bottom of said main fuel tank.

8. The combination with a main liquid fuel tank of an auxiliary fuel reservoir therewithin resting on the bottom thereof, a reservor discharge tube connected at one end to a low portion of said reservoir, the other end of said tube being open and in a lower position thereof lying adjacent to said bottom of said main fuel tank whereby said reservoir is adapted to be filled with the filling of said main tank, and mechanism operably associated with said tube for selectively raising and lowering the open end of said tube.

9. The combination with a main liquid fuel tank of an auxiliary fuel reservoir therewith, a reservoir discharge tube connected at one end to a low porton of said reservoir, the other end of said tube being open and in a lower position thereof lying adjacent to said bottom of said main fuel tank whereby said reservoir is adapted to be filled with the filling of said main tank, and mechanism operably associated with said tube for selectively raising and lowering the open end of said tube.

References Cited in the file of this patent

UNITED STATES PATENTS

| | | |
|---|---|---|
| 1,990,605 | Johnson | Feb. 12, 1935 |
| 2,476,203 | Manol | July 12, 1949 |
| 2,531,847 | Haley | Nov. 28, 1950 |